INVENTORS
PAUL F. PAGE
HARRY L. LAMBERT
ALTON G. SNYDER
BY Thomas S. Ross
Albert W. Scribner
ATTORNEYS April 11, 1961 P. F. PAGE ET AL 2,979,277

RECORD TAPE TRANSPORTS

Filed Oct. 14, 1957 4 Sheets-Sheet 2

INVENTORS
PAUL F. PAGE
HARRY L. LAMBERT
ALTON G. SNYDER
BY Thomas S. Ross
Albert W. Scribner
ATTORNEYS April 11, 1961 P. F. PAGE ET AL 2,979,277

RECORD TAPE TRANSPORTS

Filed Oct. 14, 1957 4 Sheets-Sheet 3

INVENTORS
PAUL F. PAGE
HARRY L. LAMBERT
ALTON G. SNYDER
BY Thomas S. Ross
Albert W. Scribner
ATTORNEYS April 11, 1961 P. F. PAGE ET AL 2,979,277

RECORD TAPE TRANSPORTS

Filed Oct. 14, 1957 4 Sheets-Sheet 4

INVENTORS
PAUL F. PAGE
HARRY L. LAMBERT
ALTON G. SNYDER
BY Thomas S. Ross
Albert W. Scribner
ATTORNEYS United States Patent Office 2,979,277

Patented Apr. 11, 1961

2,979,277

RECORD TAPE TRANSPORTS

Paul F. Page, Newington, Harry L. Lambert, West Hartford, and Alton G. Snyder, Newington, Conn., assignors to Royal McBee Corporation, Port Chester, N.Y., a corporation of New York Filed Oct. 14, 1957, Ser. No. 690,120

13 Claims. (Cl. 242—55.12)

This invention relates to a record transport device and more particularly relates to an improved system for mounting and driving the record tape supporting reels of a data processing machine.

In conventional tape type record reading apparatus, the record is fed from a first tape supporting reel, over a reading or sensing head and onto a second tape supporting reel. Here the means for rotatably mounting said reels in the reader normally comprises a pair of shafts which operatively engage the respective hub portions of said reels; one or both of said shafts being adapted to drive its associated reel. In this sort of an arrangement there must be sufficient space provided in the tape reading apparatus to allow said reels to be moved axially onto and off the outer ends of said shafts. A central bearing aperture in each of the said reels must also be provided as well as means for rotatably securing said reels to their respective mounting shafts. These requirements may be inconvenient in addition to increasing manufacturing costs; for example, when using conventional types of record tape transport devices considerable time and effort may be used in getting each of the tape supporting reels properly mounted and positioned on their respective supporting shafts.

One object of the instant invention is to provide an improved tape transport for a record reading device.

Another object of the invention is to provide an improved means for mounting and actuating one or more record supporting reels.

Another object of the invention is to provide a novel peripheral mounting and driving means for a pair of cooperating record tape supporting reels, whereby said reels may be easily and quickly brought to and removed from their respective operative positions.

Another object of the invention is to provide an improved apparatus for feeding a record tape at read speeds whereby the drive means for rotating the tape take-up reel includes a pair of simultaneously operable clutches.

Another object of the instant invention is to provide a novel tape feed drive mechanism wherein a normally driven toothed sprocket drum is permitted to idly rotate during the rapid feed movements of the record tape.

Still another object of the instant apparatus is to provide a novel means for rotatably supporting a record tape reel whereby the tape reel may be radially moved into and out of an operative position and whereby said reel may be radially locked in said operative position by supporting means which engage the periphery of the reel at points which collectively subtend more than 180 degrees of the reel periphery.

A further object of the invention is to provide a novel means for peripherally mounting a pair of record tape supporting reels and for peripherally driving said reels by interrelated drive means at relatively fast or slow rotational speeds.

Other objects of the invention will appear as the disclosure progresses.

The structural and operational details of the tape reading apparatus associated with the instant tape transport device may be similar to that described in copending application for Automatic Apparatus for Operating Business Machines, Serial No. 690,099, filed October 14, 1957, now Patent Number 2,894,614.

Figure 1:
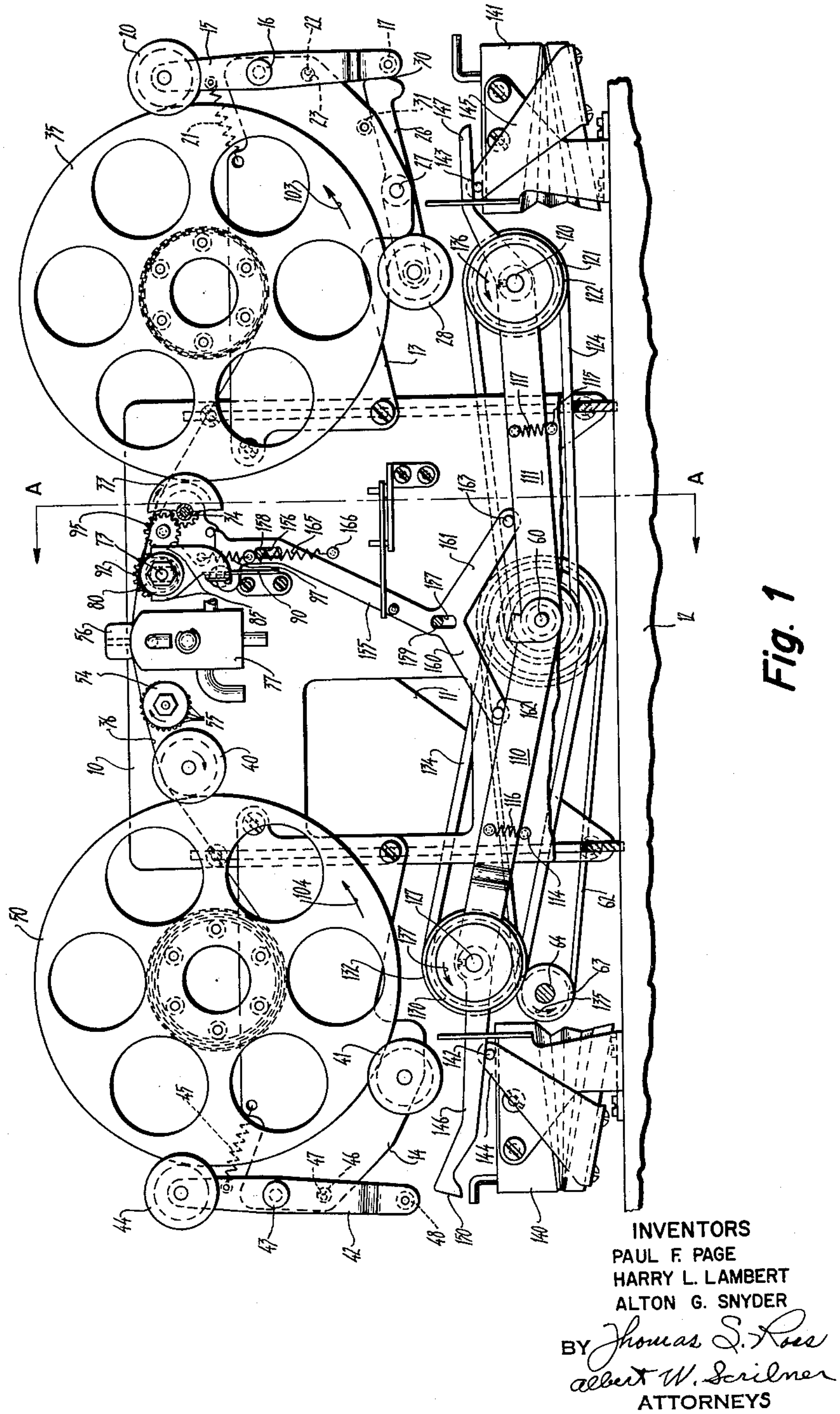
Fig. 1 is a side elevational view showing the principal parts of the instant tape transport apparatus, said parts being in their respective normal positions.
Figure 6:
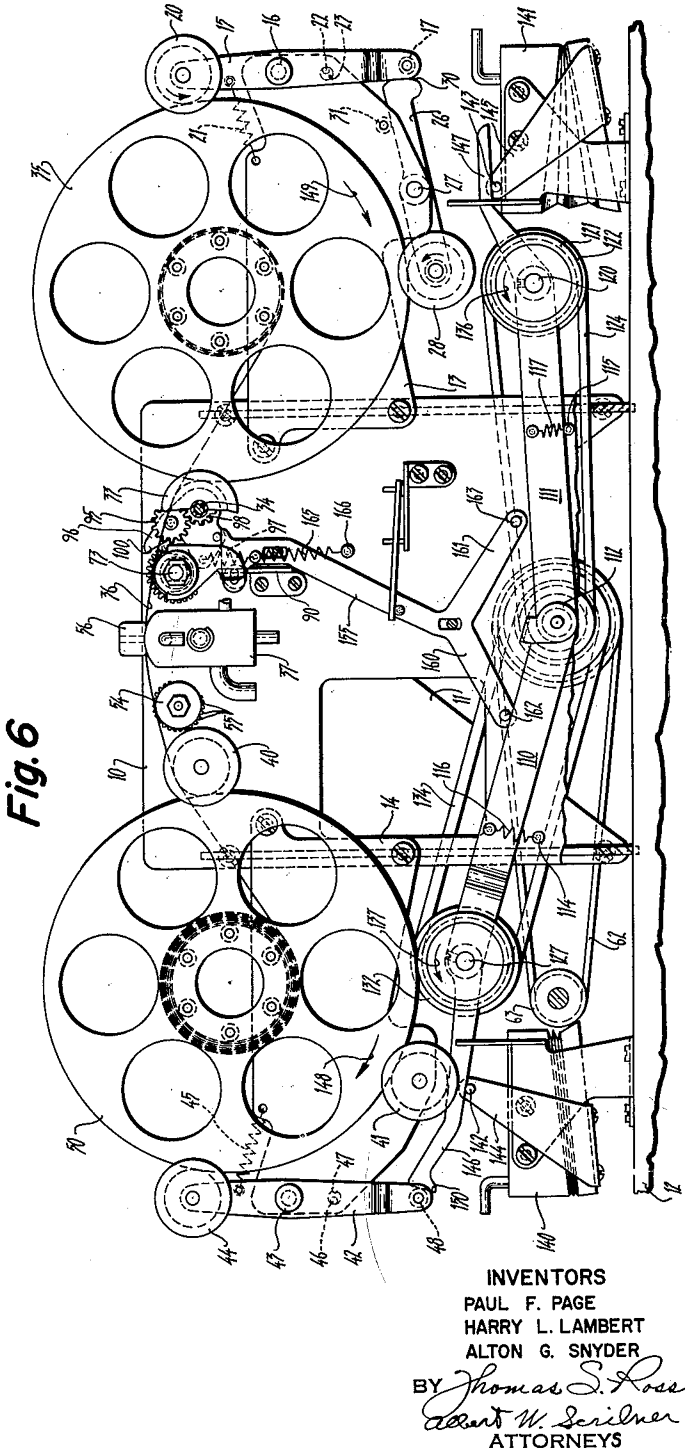
Fig. 6 is a side elevational view corresponding to Fig. 1 and shows some of said principal parts in their respective active positions.

Referring to the drawings wherein like reference numerals in the different views respectively refer to the same element, a pair of main frame plates 10 and 11 are fixedly secured to a suitable base 12 and are vertically disposed in parallel spaced relation. The frame extension plates 13 and 14 are fixedly secured to the right and left hand ends of the front frame plate 10. A lever 15 is pivotally secured, as at 16, to the outer end of the extension frame plate 13; the lower end of said lever being provided with a laterally extending stud 17 while the upper end thereof rotatably supports a flanged spool 20. A spring 21 biases said lever in a counterclockwise direction as viewed in Fig. 1; the limits of rotative movement of lever 15 being determined by engagement of the lever pin 22 with the opposed walls of an aperture 23 formed in said plate 13. A second lever 26 is pivotally secured, as at 27, to the lower end of plate 13; the left end, Fig. 1, of lever 26 rotatably supporting a second flanged spool 28. An inclined cam surface 30 is formed on the right end of lever 26 and is adapted to slidably engage the said stud 17 of the lever 15. The counterclockwise limit of rotational movement of lever 26 is determined by its engagement with the fixed stud 31 secured to said plate 13. A third flanged spool 33, Figs. 1 and 6, is rotatably mounted on a shaft 34 which is fixedly secured to the front main plate 10.

The flanged spools 20, 28 and 33 are disposed in a common plane and are each adapted to axially straddle the periphery of a conventional tape take-up reel 35, thereby cooperatively defining a three point peripheral support for rotatably mounting said reel 35. In operation the reel may be rotatably driven at read speeds in a counterclockwise direction by frictional engagement with the driving spool 33 to thereby progressively draw the punched tape 36, Fig. 1, over the reader head 37 and onto the said reel. During such operations most of the weight of the reel 35 will be supported by spool 28 thereby causing lever 26 to remain in engagement with said pin 31. Meanwhile the spring 21 biases the spool 20 into engagement with the periphery of reel 35 and in that the axes of said spools 20 and 33 are located at a level above the axis of reel 35, i.e. the axes of the three spools 20, 28 and 33 collectively subtend more than 180 degrees of the periphery of reel 35, said reel will be yieldably retained in operative engagement with all three of said spools during normal tape reading operations. In this condition of the parts the stud 17 at the lower end of lever 15 will be spaced from the camming surface 30 on the end of said lever 26.

Flanged spools 40 and 41 are respectively rotatably mounted on the left end of frame plate 10 and on the lower side of said frame extension plate 14. A lever 42 is pivotally mounted, as at 43, on the outer end of plate 14 and rotatably supports at its upper end a flanged spool 44. A spring 45 biases lever 42 in a clockwise direction, Fig. 1, between two limits of pivotal movement determined by the engagement of the lever pin 46 with the opposed walls of an aperture 47 formed in said frame extension plate 14. The lower end of lever 42 is provided with a laterally extending stud 48.

The flanged spools 40, 41 and 44 are disposed in a common plane which is coextensive with the plane of said first three spools 20, 28 and 33. Said spools 40, 41 and 44 are each adapted to axially straddle and peripherally support the punched tape pay-out reel 50 in a manner similar to that of said first three spools. In that the axes of said spools 40 and 44 are located at a level about the axis of the "pay-out" reel 50, i.e. the axes of spools 40, 41 and 44 collectively subtend more than 180 degrees of the periphery of the reel 50, spring 45 will yieldably retain the reel 50 in rotative engagement with all three of said spools 40, 41 and 44.

An idler tape feed sprocket drum 54 is rotatably mounted on the main frame plate 10. The drum 54 is provided with a plurality of coplanar peripherally spaced sprocket teeth 55 which engage the usual central column of small feed holes formed in the punched tape 36. The tape guide block 56 is movably mounted on the frame plate 10 by any suitable means and is adapted to retain the tape 36 in operative sliding engagement with the upper surface of reading head 37.

The above described arrangement for rotatably mounting the tape reels 35 and 50, will permit said reels to be quickly and easily inserted into and removed from their respective operative positions shown in Fig. 1; such insertion or removal being accompanied by a yielding pivotal movement of the levers 15 and 42. During normal "read" operations the tape 36 will be fed from the reel 50 over the spool 40, idler drum 54, reading head 37 and the driven spool 33, and onto the reel 35.

The punched tape 36 may be driven in a forward direction, from left to right as seen in Fig. 1, at a relatively slow read speed by means of the said driving spool 33, or may be rapidly driven in a forward or reverse direction by a different drive means to be described. The rapid forward movement of the tape 36 will be hereinafter referred to as a skip-forward tape movement while a rapid reverse displacement thereof will be hereinafter referred to as a rewind tape movement. The pneumatic sensing or reading of the tape 36 occurs only when said tape is driven at said relatively slow read speeds.

Figure 2:
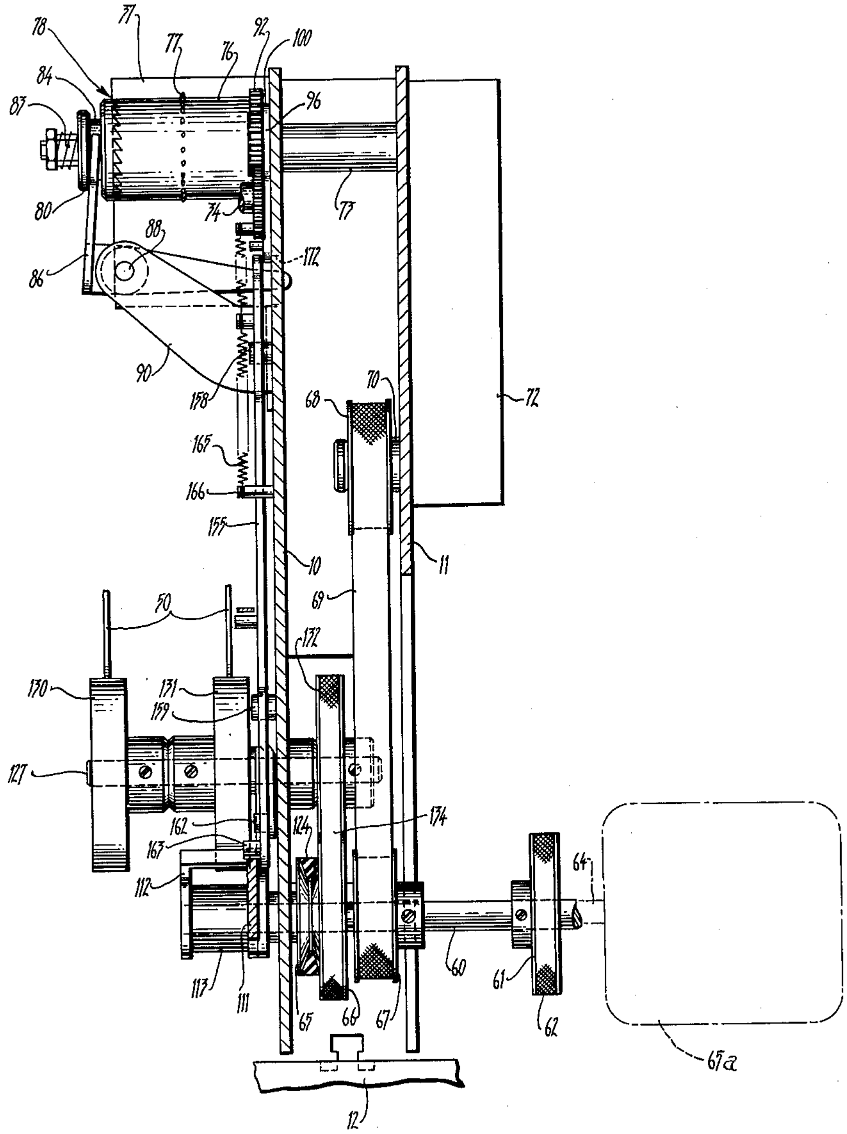
Fig. 2 is a side elevational view taken in partial section along the vertical section line A—A of Fig. 1.

The means for driving the spool 33 will now be described in detail, reference being made to Figs. 1–3. A main drive shaft 60 of the machine is suitably journalled in the lower central portion of the frame plates 10 and 11. Rotatably secured to the inner end of the main shaft 60 is a pulley 61, Fig. 2, which is driven through a belt 62 from the pulley 63, Fig. 1, which is secured to the shaft 64 of motor 65*a*, Fig. 2. Three pulleys 65, 66 and 67, Fig. 2, are rotatably secured to the main shaft 60 and are disposed between said frame plates 10 and 11. The pulley 67 rotatably drives the pulley 68, Fig. 2, by means of a belt 69; said pulley 68 being rotatably mounted on the stub shaft 70 fixed on the frame plate 11. Pulley 68 is operatively connected to the transmission unit 72 which is secured to the frame plate 11 and which has an output shaft 73; the transmission unit 72 being of any suitable type to impart the desired rotational movement to said output shaft 73. If an intermittent rotational movement of shaft 73 is desired then said transmission may be of a type similar to that shown in the said U.S. Patent 2,894,614. The shaft 73 extends through the main frame plates 10 and 11 and rotatably supports at its outer end a tape feed sprocket drum 76 which is provided with a plurality of peripherally spaced teeth 77. The sprocket drum 76 may be rotatably coupled to or uncoupled from the said shaft 73 by means of a clutch which is generally designated by reference numeral 78, Figs. 2–3. Said clutch 78 comprises a member 80 which is axially movable relative to shaft 73 but which is rotatably secured thereto; the inner end of said member 80 being provided with teeth 81 which are adapted to operatively engage the teeth 82, Fig. 3, formed on the adjacent end of the sprocket drum 76. A compression spring 83 operatively mounted between the left hand end of the shaft 73 and the member 80 serves to yieldably bias said member 80 into coupling engagement with the sprocket drum 76. The member 80 is provided with a peripheral groove 84 in which is disposed the arms 85 of the clutch operating yoke 86. Said yoke 86 is pivotally mounted, as at 88, on the bracket 90 which is suitably fixed to the main frame plate 10. It will be apparent that the clutch member 80 may be moved to its respective coupling and uncoupling positions by pivotally actuating the said yoke 86.

Figure 3:
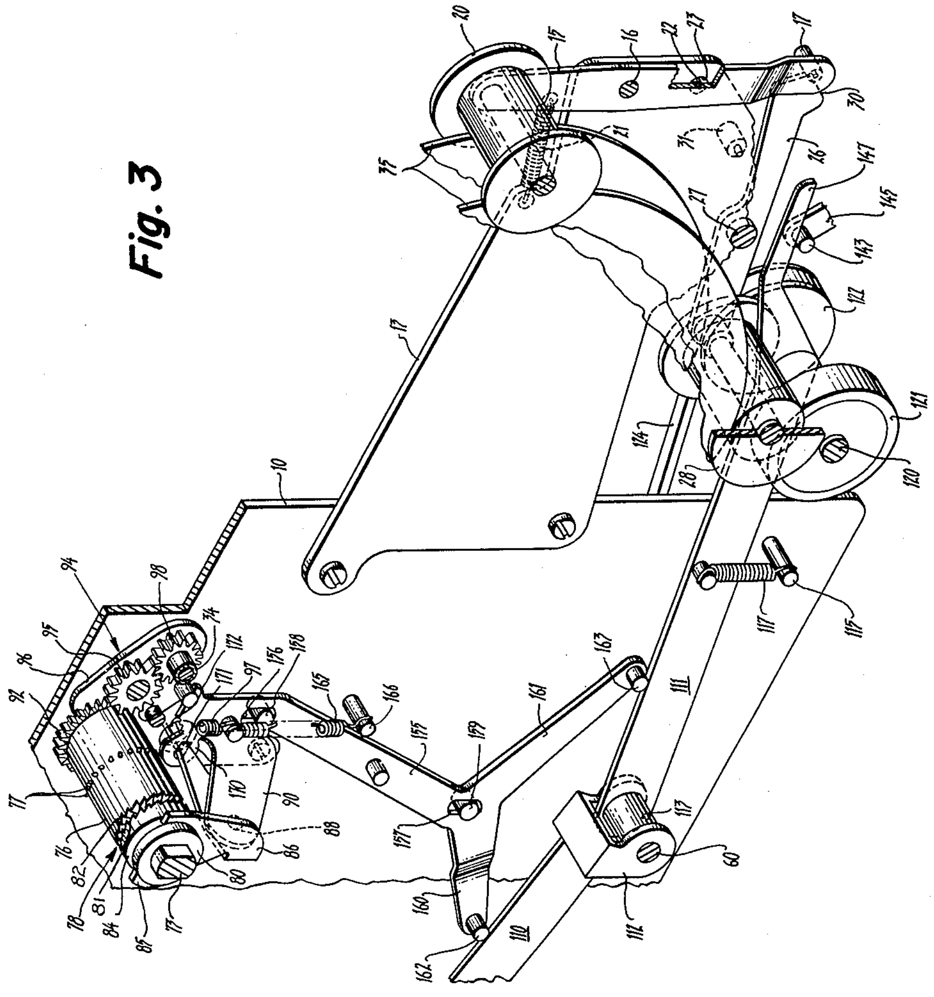
Fig. 3 is a perspective view showing a portion of the apparatus illustrated in Fig. 1.
Figure 4:
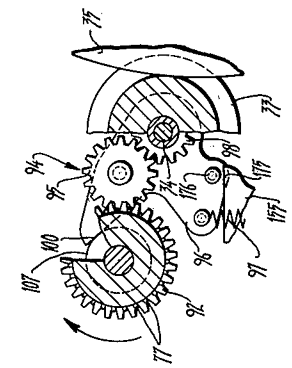
Fig. 4 is a fragmentary side elevational view showing the engaged condition of one of the clutches used in the apparatus of Fig. 1.

A gear 92, Figs. 2–4, is formed on the inner end of the sprocket drum 76. Said gear 92 is rotatably connected to the said spool 33 through a clutch which is generally indicated at 94, Figs. 3–4. A gear 95 rotatably mounted on the gear plate 96 is adapted to be swung into mesh with the gear 92. The plate 96 is pivotally mounted on the said shaft 34, Fig. 1, and is biased in a counterclockwise direction by the tension spring 97. Gear 95 meshes with the gear 98 which is coaxially fixed on said tape reel driving spool 33. In the counterclockwise position of gear plate 96, as shown in Fig. 4, the clutch 94 will be operatively engaged so that the rotary motion of the sprocket drum 76 may be transmitted to the said spool 33. As will be evident later the said clutches 78 and 94 are operated simultaneously, i.e. at any given time said clutches are either both engaged or both disengaged.

The above described gearing serves to rotatably connect the tape reel drive spool 33 and the tape reel 35 with the main drive shaft 60, Figs. 1, 2, when said clutches are in their respective engaged conditions. During normal tape reading operations then the reel 25 and the reel 50 through the tension in the tape 36 will be driven in a counterclockwise direction as indicated by arrows 103 and 104, Fig. 1, so as to feed the tape 36 from left to right over the reading head 37.

As previously mentioned, means are provided for rotatably driving the tape reels 35 and 50 at rapid speeds for skip-forward and rewind operations. Such means comprise a pair of lever arms 110 and 111, Fig. 1, which are pivotally mounted on the outer end of main drive shaft 60; the bail like hub portion 112, Fig. 2, of lever arm 110 straddling the cylindrical hub portion 113 of lever arm 111. Said arms 110 and 111 are normally biased downwardly into engagement with the fixed studs 114 and 115 by means of tension springs 116 and 117 respectively. Rotatably mounted near the outer end of arm 111 is a short shaft 120. A drive wheel 121, Fig. 3, and a pulley 122 are secured to the respective ends of said shaft 120. The pulley 122 and the pulley 65, Fig. 2, mounted on the main drive shaft are coplanar and are interconnected by the belt 124. The drive wheel 121 and the flanged spool 28 are substantially coplanar; the former being adapted to be moved into frictional engagement with the latter.

A shaft 127, Fig. 1, is rotatably mounted at the outer end of the lever arm 110. A pair of drive wheels 130 and 131 and a pulley 132 are rotatably secured to said shaft 127 as shown in Fig. 2. Drive wheels 130 and 131 are respectively coplanar with the main side flanges of the tape reel 50. The pulley 132 and said pulley 66 mounted on the main drive shaft are coplanar and are interconnected by a belt 134, Fig. 1. The motor shaft 64, Fig. 1, rotates at a substantially constant speed in the direction shown by arrow 135, hence the said drive wheels 121, 130 and 131 will be constantly rotated in the directions shown by arrows 136 and 137. The peripheral contact surfaces of the said drive wheels as well as the cylindrical portion of the spool 28 are preferably coated with rubber or like material in order to improve the frictional driving efficiency thereof.

Two conventional type pneumatic actuators 140 and 141 are mounted on the said base 12 and the pins 142 and 143 secured to the ends of the movable arms 144 and 145 thereof, are adapted to respectively engage and lift the outer ends 146 and 147 of said lever arms 110 and 111 when said actuators are operated. When the actuator 141 is operated the rotating drive wheel 121, Fig. 3, will be elevated into frictional engagement with the cylindrical body portion of said flanged spool 28, and will rotatably drive the latter. Said spool 28 being in supporting engagement with the periphery of the take-up reel 35 will thereby rotatably drive said reel in the direction indicated by arrow 103 of Fig. 1. When reel 35 is being thus driven the reel 50 will be rotated by the tension in the tape 36, in a direction noted by the arrow 104, thereby affecting a skip-forward movement of the tape 36. It will be noted that when drive wheel 121 exerts an upward contact force on the spool 28 the camming surface 30 on the outer end of lever 26 will engage the pin 17 as shown in Fig. 3 and will outwardly displace the lower end of lever 15 to a slight extent thereby positively moving and holding the spool 20 against the periphery of reel 35 so as to overcome any tendency for said reel to move out of operative contact with the three spools 20, 28 and 33.

In like manner when the bellows actuator 140 is operated, as shown in Fig. 6, the rotating drive wheels 130 and 131 will be elevated into direct frictional engagement with the periphery of the reel 50 to thereby rotatably drive the latter in a direction shown by arrow 148. When the reel 50 is thus driven, the reel 35 will be rotated by the tension in the tape in a direction indicated by arrow 149, Fig. 6, to thereby affect a rewind movement of tape 36. When said bellows actuator 140 is operated the end 150 of the lever arm 110 will be moved to a position so as to lie immediately to the right of the pin 48 of lever 42. In this condition of the parts the flanged spool 44 will be positively held in engagement with the periphery of reel 50 to thereby resist any tendency for said reel to be lifted out of operative engagement with the three spools 40, 41 and 44 when said drive wheels 130 and 131 are in frictional driving contact with the periphery of said reel 50. Upon the termination of operation of either of the said bellows 140 and 141, springs 116 and 117 will restore the lever arms 110 and 111 to their respective normal positions shown in Fig. 1.

In order to prevent a simultaneous operation of the read and rapid speed drives for the tape reels 35 and 50, an interlock mechanism is provided whereby when either the skip-forward or the rewind drive for said reels is operated, the feed speed drive for the spool 33 is disabled. Referring to Figs. 1–3, said interlock mechanism comprises a lever 155 having slots 156 and 157 formed therein, the walls of which are respectively engaged by the studs 158 and 159 secured to the main frame plate 10. The lower end of the vertically movable lever 155 has two arms 160 and 161 which are respectively provided with pins 162 and 163. Lever 155 is biased downwardly by the tension spring 165 which is secured between the lever 155 and a frame plate stud 166, the lower limit of movement of said lever being determined by the engagement of either of the pins 162, 163 with the upper edges of lever arms 110 and 111. The upper end of lever 155 is provided with a laterally extending arm 170, Fig. 3, in which is formed an aperture 171. The inner end of the said clutch yoke 86 extends through said aperture 171 and also through the aperture 172, Fig. 2, formed in the frame plate 10.

It will be evident that when either of the lever arms 110 or 111 is elevated in order to engage the rapid drive for the tape reels, the lever 155 will also be elevated so as to pivotally displace the clutch yoke 86 in a counterclockwise direction, Fig. 2, thereby disengaging the clutch 78 and discontinuing the power drive to the tape feed sprocket drum 76 and the tape reel driving spool 33. The clutch 78 will not be reengaged until the actuated arm 110 or 111 has been lowered to its inoperative position shown in Fig. 1.

During a rewind or a skip-forward operation it is desirable to avoid any undue longitudinal stresses on the tape 36 which might be imposed by having the latter rapidly accelerate the sprocket drum 76 and the spool 35, gears 98 and 95, Fig. 4. In order to obviate this potential difficulty means are provided to disengage the clutch 94, Fig. 4, to thereby permit the sprocket drum 76 to rotate idly on its supporting shaft 73 during rewind or skip-forward operations. Such means comprise a shoulder 175, Fig. 4, which is formed on the upper end of lever 155 and which underlies the pin 176 fixed to the said pivotal gear plate 96. When lever 155 is elevated as above described the shoulder 175 thereof will engage and lift the pin 176 thereby swinging said gear plate 96 in a clockwise direction about the shaft 34 against the action of spring 97. Clutch 94 being thus disengaged the sprocket drum 76 is then free to idly rotate on its supporting shaft 73. When lever 155 is lowered spring 97 will swing the gear plate 96 in a counterclockwise direction so as to operatively reengage the said clutch 94 at the same time that the clutch 78, Fig. 2, is also being reengaged.

Figure 5:
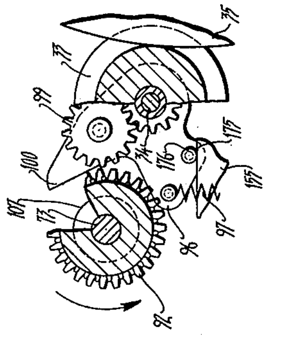
Fig. 5 is a fragmentary side elevational view showing the clutch of Fig. 4 in its disengaged condition.

In operation the storage tape reel 50 and the take-up reel 35 are lowered onto their respective supporting spools and a short length of the record tape 36, being unwound from reel 50, is extended over the sensing or reading head 37 and is secured to and wound onto the reel 35. If a considerable length of the tape must be wound onto reel 35 before a reading operation is to take place, the pneumatic actuator 141 is operated to elevate the drive wheel 121 into operative engagement with the flanged spool 28, as shown in Fig. 3, to thereby rapidly rotate the reel 35. During this operation the lever 155 will retain both of the clutches 78, Fig. 2, and 94, Fig. 5, in their respective disengaged conditions thereby permitting the sprocket drum 76 to rotate idly on its supporting shaft 73. When the tape reading operations are to commence, the drive wheel 121 is lowered thereby reengaging the said clutches 78 and 94 so that the flanged spool 33, Fig. 1, will drive the reel 35 at a relatively slow rate of rotative speed in a direction indicated by arrow 103, Fig. 1. When it is desired to rewind the tape 36 onto the reel 50 the pneumatic actuator 140 is operated to disengage clutches 78 and 94 and to elevate the drive wheels 130, 131, into operative engagement with the periphery of said reel 50 whereby the latter will be rapidly rotated in a direction shown by arrow 148, Fig. 6. After the tape 36 has been rewound on reel 50 and the lever 110 lowered, said reels may be readily lifted upwardly out of the machine.

While there is in this application specifically described one form which the invention may assume in practice, it will be understood that this form of the same is shown for purposes of illustration only and that the invention may be modified and embodied in various other forms without departing from the spirit or the scope of the appended claims.

The invention claimed is:

1. A record transport device; comprising, a frame, a first and a second flanged spool rotatably supported in said frame, a lever movably mounted on said frame, a third flanged spool rotatably supported on said lever, said spools being adapted to peripherally support a tape reel and disposed so as to subtend more than 180 degrees of the periphery of said reel, and means for driving one of said spools.

2. Apparatus as defined in claim 1; additionally comprising, means for driving a second one of said spools.

3. A record transport device; comprising, a frame, means for rotatably supporting a pair of tape reels on said frame, a main drive shaft rotatably mounted on said frame, a pair of levers pivotally connected to said shaft, a drive wheel rotatably mounted at the movable end of each of said levers, means connected to said main drive shaft for rotating said wheels, said levers being selectively pivotable about said shaft so as to respectively drive said tape reels, and power operated means for respectively pivotally displacing said levers.

4. A record transport device; comprising, a frame, a plurality of spools rotatably mounted on said frame for rotatably supporting a pair of tape reels, means for driving at least one of said spools, said means comprising a drive shaft rotatably mounted on said frame, a tape feed sprocket drum rotatably mounted on said shaft, a first clutch for rotatably interconnecting said shaft and said sprocket drum, means including a second clutch for rotatably interconnecting said drum and said one spool, and means for simultaneously operating said clutches.

5. Apparatus as defined by claim 4; additionally comprising, a rotatable drive wheel swingably mounted on said frame and adapted to frictionally drive the periphery of one of said reels, and means responsive to the swinging movement of said drive wheel for actuating said clutch operating means.

6. A tape transport device; comprising, a main frame, a lever pivotally mounted on said frame, a first flanged spool rotatably mounted on said lever, said lever being adapted to be pivoted to tape reel retaining and releasing positions, a second and a third flanged spool rotatably mounted on said frame and being disposed in the plane of said first spool, a rotatable drive wheel swingably mounted on said frame and being adapted to rotatably drive a tape reel mounted on said spools, and means for holding said lever in its said tape reel retaining position when said drive wheel is driving said tape reel.

7. A tape transport device; comprising, a frame, a pair of flanged spools rotatably mounted on said frame, a lever pivotally mounted on said frame, a third flanged spool rotatably mounted on said lever, said spools being adapted to peripherally support a tape reel for rotational movement, an arm articulately mounted on said frame, a drive wheel rotatably mounted on said arm, said arm being adapted to pivotally move so as to cause said drive wheel to engage the periphery of said tape reel, means for rotating said drive wheel, and means on said arm for preventing pivotal movement of said lever when said drive wheel is rotatably driving said tape reel.

8. A tape transport device; comprising, a frame, a plurality of flanged spools mounted on said frame and cooperatively adapted to rotatably support a pair of tape reels, means for rotatably driving one of said spools so as to feed a record at read speeds, means mounted on said frame and adapted to be moved so as to rotatably drive said one reel at relatively rapid speeds, and means responsive to the operation of one of said drive means for disconnecting the other of said drive means.

9. Appartus as defined by claim 6 wherein said wheel frictionally engages one of said spools.

10. Apparatus as defined by claim 6 wherein said wheel is adapted to frictionally engage the periphery of said tape reel.

11. In a tape transport device, a frame, means for rotatably supporting a pair of record reels on said frame, means for rotatably driving at least one of said reels at relatively slow speeds, means for rotatably driving said one reel in the same rotative direction at relatively rapid speeds, the last mentioned means comprising an arm pivotally mounted on said frame, a drive wheel rotatably mounted on an outer end of said arm and adapted to be swung into and out of engagement with the periphery of said one reel, and means normally maintaining said drive wheel out of engagement with said reel, means for rotatably driving said wheel, and power operated means for arcuately displacing said arm so that said drive wheel frictionally engages the periphery of said tape reel and thereby rotatably drives the latter.

12. A record transport device; comprising, a frame, a plurality of coplanar flanged spools rotatably mounted on said frame and adapted to peripherally support a pair of record reels for rotational movement, a shaft rotatably mounted in said frame, a sprocket drum rotatably mounted on said drum, means for coupling said shaft and drum, means driven from said shaft for rotatably driving one of said reel supporting spools, a pair of arms movably supported on said frame, a drive wheel rotatably mounted on the end of each of said arms, drive means for rotating said wheels, means for respectively moving said arms and wheels to and from record reel driving positions, and means operated by the actuation of the last means for disengaging said coupling means.

13. In a record transport; a frame, at least one record reel rotatably mounted in said frame, a shaft rotatably mounted on said frame, a sprocket drum rotatably mounted on said shaft, means for mutually rotatively coupling and uncoupling said shaft and sprocket drum, means for rotatably driving said record reel, means for mutually coupling and uncoupling said reel drive means from said sprocket drum, and means for simultaneously operating both of said coupling means.

References Cited in the file of this patent

UNITED STATES PATENTS

| | | |
|---|---|---|
| 1,846,004 | Green | Feb. 16, 1932 |
| 2,091,525 | Runge | Aug. 31, 1937 |
| 2,109,627 | Finch | Mar. 1, 1938 |
| 2,304,913 | Herzig | Dec. 15, 1942 |
| 2,657,871 | Pettus | Nov. 3, 1953 |